(12) United States Patent
Hillegass et al.

(10) Patent No.: US 7,076,468 B2
(45) Date of Patent: Jul. 11, 2006

(54) METHOD AND SYSTEM FOR LICENSING DIGITAL WORKS

(76) Inventors: James C. Hillegass, 18150 Breezy Point Rd., Woodland, MN (US) 55391; Yaobing Deng, 911 - 22nd Ave. S., Apt. 162, Minneapolis, MN (US) 55404; Mark Eastom, 53 - 15th Ave. SW., New Brighton, MN (US) 55112; Richard R. Fritz, 8425 Passfield Turn, Plymouth, MN (US) 55447; John C. Gateley, 15390 - 18th Ave. N., Apt. 1107, Plymouth, MN (US) 55447; James A. Grinsfelder, 1466 Lincoln Ave., St. Paul, MN (US) 55105; Stephen A. Grove, 3901 - 45th Ave. S., Minneapolis, MN (US) 55406; Eric Steven Hockett, 322 Clifton Ave. #102, Minneapolis, MN (US) 55403; Nikolay G. Sokratov, 3951 Quentin Ave. S., St. Louis Park, MN (US) 55416; James G. Swanson, 1715 Eleanor Ave., St. Paul, MN (US) 55116; John S. Thomson, P.O. Box 113, Afton, MN (US) 55001; Boris Mamedov, 9117 - 11th Ave. S., Apt. 5, Hopkins, MN (US) 55343; James A. Nordgaard, 2925 Monterey Ave. S., St. Louis Park, MN (US) 55416; Paul E. Onnen, 26021 SE. 27th St., Issaquah, WA (US) 98029

( * ) Notice: Subject to any disclaimer, the term of this patent is extended or adjusted under 35 U.S.C. 154(b) by 621 days.

(21) Appl. No.: 09/844,475

(22) Filed: Apr. 27, 2001

(65) Prior Publication Data
US 2002/0010681 A1    Jan. 24, 2002

Related U.S. Application Data

(60) Provisional application No. 60/200,230, filed on Apr. 28, 2000, provisional application No. 60/200,193, filed on Apr. 28, 2000.

(51) Int. Cl.
*G06F 17/60*    (2006.01)

(52) U.S. Cl. .......................... 705/56; 705/59; 713/164

(58) Field of Classification Search ............ 705/26–27, 705/39–44, 50–59, 64, 71–79; 713/164–171, 713/200–202; 380/200–202, 229–233; 707/1–10, 707/100–104
See application file for complete search history.

(56) References Cited

U.S. PATENT DOCUMENTS

| | | | |
|---|---|---|---|
| 5,260,999 A | 11/1993 | Wyman | |
| 5,694,334 A | 12/1997 | Donahue et al. | |
| 5,742,757 A * | 4/1998 | Hamadani et al. .......... | 713/200 |
| 5,765,152 A | 6/1998 | Erickson | |
| 5,832,083 A | 11/1998 | Iwayama et al. | |
| 5,933,498 A * | 8/1999 | Schneck et al. ............. | 705/54 |
| 5,935,243 A | 8/1999 | Hasebe et al. | |
| 5,974,141 A | 10/1999 | Saito | |
| 5,987,441 A | 11/1999 | Lee et al. | |
| 6,002,768 A | 12/1999 | Albanese et al. | |
| 6,009,173 A | 12/1999 | Sumner | |
| 6,169,976 B1 | 1/2001 | Colosso | |
| 6,189,146 B1 | 2/2001 | Misra et al. | |
| 6,223,291 B1 | 4/2001 | Puhl et al. | |
| 6,226,618 B1 | 5/2001 | Downs et al. | |
| 6,247,130 B1 | 6/2001 | Fritsch | |
| 6,260,024 B1 * | 7/2001 | Shkedy ......................... | 705/37 |
| 6,363,486 B1 | 3/2002 | Knapton, III | |
| 6,499,035 B1 | 12/2002 | Sobeski | |
| 6,578,014 B1 * | 6/2003 | Murcko, Jr. ................ | 705/26 |
| 6,587,837 B1 | 7/2003 | Spagna | |
| 6,775,655 B1 | 8/2004 | Peinado et al. | |

FOREIGN PATENT DOCUMENTS

JP    2003178164 A  *  6/2003

OTHER PUBLICATIONS

"ID-Trak™ Enterprise Offers Scalable, Realtime Defenses for Distributed Intranets, Extranets and Internet Sites", PR Newswire, p0323, Oct. 13, 1998.*

Peter Sohal, J. River, Inc., J. River Music Exchangeä enables Secure Sales and Licensing of On-line Music, Press Release, Feb. 26, 1999, Minneapolis, MN.

* cited by examiner

*Primary Examiner*—Mary D. Cheung
(74) *Attorney, Agent, or Firm*—Beck & Tysver, P.L.L.C.

(57) ABSTRACT

A method and system is presented for a digital licensing scheme that separates the license from the digital file containing the copyrightable material. According to the present invention, the files can be downloaded from any server, and transferred from user to user, even after the file has been licensed. The present invention utilizes producer software running on a vendor's computer, server software running on a computer provided by the license provider, and player software operating on the user's computer. Digitally encrypted communication streams keep communications between the producer software, the license provider, and the player software confidential. A software component running on the user's computer checks to make sure that the appropriate product license has been purchased. This is accomplished by comparing the product ID in the product license with the product ID contained in the product file. The software also checks that the person seeking to play the product file is the user that actually paid for the license. This is accomplished by comparing the user ID in the product license with a user ID in a user license. Finally, an operating system ID found in the user license is compared with the same information obtained from the currently running operating system, to ensure that the user license was created for the currently operating computer.

20 Claims, 9 Drawing Sheets

METHOD AND SYSTEM FOR LICENSING DIGITAL WORKS

CROSS-REFERENCE TO RELATED APPLICATIONS

This application claims the benefit of U.S. Provisional Application Ser. No. 60/200,230, filed on Apr. 28, 2000, and U.S. Provisional Application Ser. No. 60/200,193, filed on Apr. 28, 2000.

TECHNICAL FIELD

The present invention relates generally to a system and method for controlling access to copyrighted materials in a digital format. More particularly, the present invention relates to a system for creating and maintaining licenses that exist separate from the copyrighted materials.

BACKGROUND OF THE INVENTION

The widespread demand for music and the growing availability of the Internet as a means of commerce have resulted in a multibillion-dollar industry for audio compact disks ("CDs") sales via the Internet. In 1999, the sales of physical CDs via the Internet accounted for $890 million. It is anticipated that this will grow to $6.7 billion by the year 2003.

Along side this growth in the sales of physical CDs is the explosive growth in Internet music downloads. Audio compression technologies such as MP3 (MPEG Layer III) have allowed digital music to be stored at compression rates of 10-1 or better. This compression technology, along with the rise of the Internet and increasing bandwidth, have led to an explosion of downloadable digital music available over the Internet. Individual tracks of music can now be downloaded from the World Wide Web, sent via e-mail, or stored and downloaded via FTP sites and Usenet newsgroups.

This new technology has brought new challenges to the policing of copyright interests in materials distributed in or convertible to digital form. Unauthorized copying of digital materials is of particular concern in the music industry, though efforts have been made to prevent it. One approach is to control access to the digital files, requiring the receipt of payment before the file can be downloaded. To prevent redistribution of files that have been downloaded, technology has been applied in attempt to limit the ability to access the files to a particular computer.

U.S. Pat. No. 5,765,152 to Erickson ("Erickson '152") describes a system and method for managing copyrighted electronic media. Erickson '152 describes the use of a registration system to make documents available over a computer network, and an authorization system for end-users to obtain the desired level of permission to use and alter the document. End users are then able to subsequently register the resulting derivative work. According to the Erickson '152 system, permissions are attached to the document file, and the user downloads or accesses the document file with the appropriate permissions attached to the document file. Thus, the permissions must co-exist with the documents. This is disadvantageous for a number of reasons. For example, if the user loses a document file, he/she also loses their permission to use the document. Further, Erickson's system contemplates distribution of documents through specific servers, i.e. the author does not have the option of posting the document from any server he/she chooses and this may be insufficient to meet the author's marketing objectives. Finally, once the document is downloaded and licensed, it cannot be further distributed since the site specific license is embedded in the file.

What is needed is a secure, digital licensing scheme that allows easy and widespread distribution of copyrightable materials, while at the same time preventing subsequent unauthorized access. Further, it would be advantageous for an authorized user to transport licensed materials between several computers. Finally, what is needed is a secure and convenient method of distributing music files, where a producer of the music can distribute files to potential customers without having to attend to licensing and selling functions.

SUMMARY OF THE INVENTION

The present invention provides a digital licensing scheme that separates the license from the digital file containing the copyrightable material. According to the present invention, the files can be downloaded from any server, and transferred from user to user, even after the file has been licensed.

The present invention utilizes producer software running on a vendor's computer, server software running on a computer provided by the license provider, and player software operating on the user's computer. Digitally encrypted communication streams keep certain communications between the producer software, the license provider, and the player software confidential.

A software component running on the user's computer checks to make sure that the appropriate product license has been purchased before allowing access to a digital product file. This is accomplished by comparing the product ID in the product license with the product ID contained in the product file. The software also checks that the user seeking to play the product file is the user that actually paid for the license. This is accomplished by comparing the user ID in the product license with a user ID in a user license. Finally, an operating system ID found in the user license is compared with the same information obtained from the currently running operating system, to ensure that the user license was created for the currently operating computer.

DETAILED DESCRIPTION OF THE INVENTION

1. Overview

Figure 1:
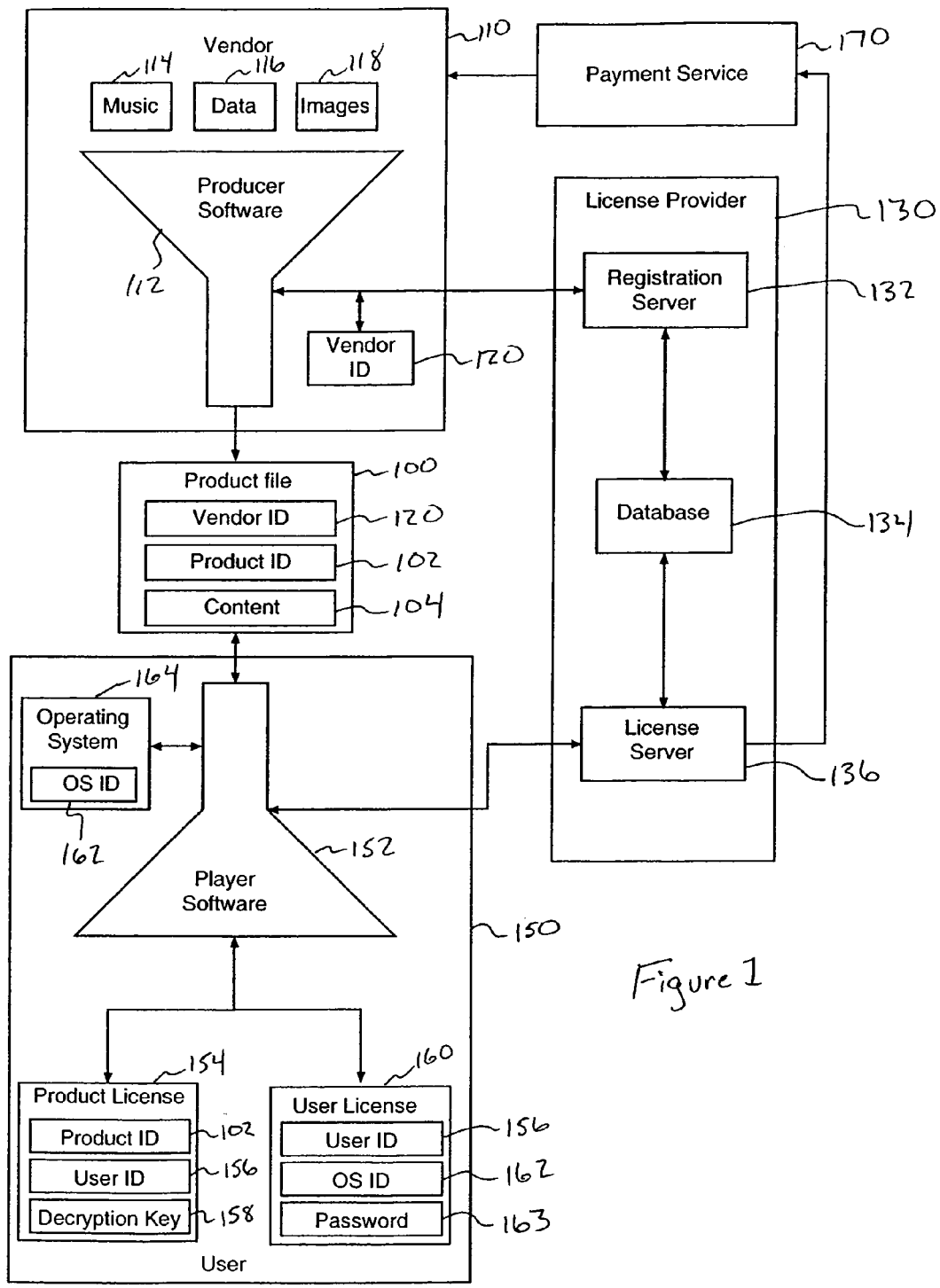
FIG. 1 is a schematic illustration of the major components of the present invention.

As shown in FIG. 1, the present invention provides a method and system for creating, playing, and licensing digital content files 100. For the purpose of example, the present invention will be described in the context of files containing digital music tracks. However, the present invention is equally applicable to files containing any type of digital material for which licensing is desired.

In the preferred embodiment, there are four parties who utilize aspects of the present invention. The first is the vendor 110, who supplies the source materials and creates the music file 100. The second party is the remote license provider 130, who is responsible for providing information for the creation and licensing of file 100. The third party is the user 150, who receives the file 100 from the vendor 110 and licenses the file 100 from the remote license provider 130. Finally, a payment service 170 ensures payment of a license fee to the vendor 110 when the license provider 130 has provided a license to the user 150. The communication between these entities could occur through any standard communication protocol. In the preferred embodiment, communication between remote computing applications is accomplished through remote procedure calls, or RPCs. Note that the functions performed by each of these entities would be fundamentally the same even if one entity took on the functions of one or two other entities shown in FIG. 1. The present invention would not be altered by such a combination of functions in single entity.

The vendor 110 could be a music producer, a record label, an independent band, or any other party who has the right to duplicate and distribute the content placed in file 100. The vendor 110 creates the file 100 using a producer program 112, which is represented in FIG. 1 with a funnel. This representation illustrates that the producer 112 takes numerous and disparate sources of content and combines them into a single file 100.

As illustrated in FIG. 1, producer 112 can accept as input multiple tracks of music 114, data 116, and images 118. The data 116 included in the file 100 could include lyrics, liner notes, UPC Codes for a CD, or information about the music such as the name of the musician(s), the title of the music collection and its individual tracks, etc. The images 118 may be still images that the vendor 110 wishes to have displayed whenever the file 100 is played. Additionally, the images 118 may be photographs of musicians, video images, cover art, or any other type of multi-media content.

The format of the inputted materials 114–118 is immaterial to the present invention, as the materials 114–118 can either be converted by the producer program 112 to a preferred format in the product file 100, or the materials 114–118 can simply be stored in the file 100 in their original format. For instance, music data 114 can be provided in any known music format such as traditional CD audio format or a standard waveform format such as WAV, AIFF, or AU. The producer software 112 would preferably save the music data 114 in a compressed format such as MP3. Images can be stored in any of the well-known compressed file types such as JPEG or GIF. Video images 118 can also be added and stored in a compressed format such as AVI (Video for Windows), MPEG, or Quicktime.

The producer program 112 is in communication with the license provider 130, specifically the registration server 132 operated by the license provider 130. The vendor 110 is identified to the license provider 130 by including its unique vendor ID 120 in its communications. The registration server 132 can be physically located on the same or nearby computer used by vendor 110 for the producer software 112. Ideally, however, the registration server 132 is remotely located, and in communication with multiple producer programs 112. The license provider 130 also operates a database 134, which stores information about vendors 110, users 150, product files 100, and licenses; and a license server 136, which is used to control the licensing of product files 100.

While the registration server 132, database 134, and license server 136 are illustrated as separate entities in FIG. 1, it is well within the scope of the invention to combine these services into one or two separate entities. For instance, a single application running on a single computer could provide all of the functionality of the registration server 132, database 134, and license server 136. Alternatively, the two servers 132, 136 could be combined and communicate with database 134. It is even within the scope of the present invention to have multiple registration servers 132 and license servers 136 functioning simultaneously.

Figure 2:
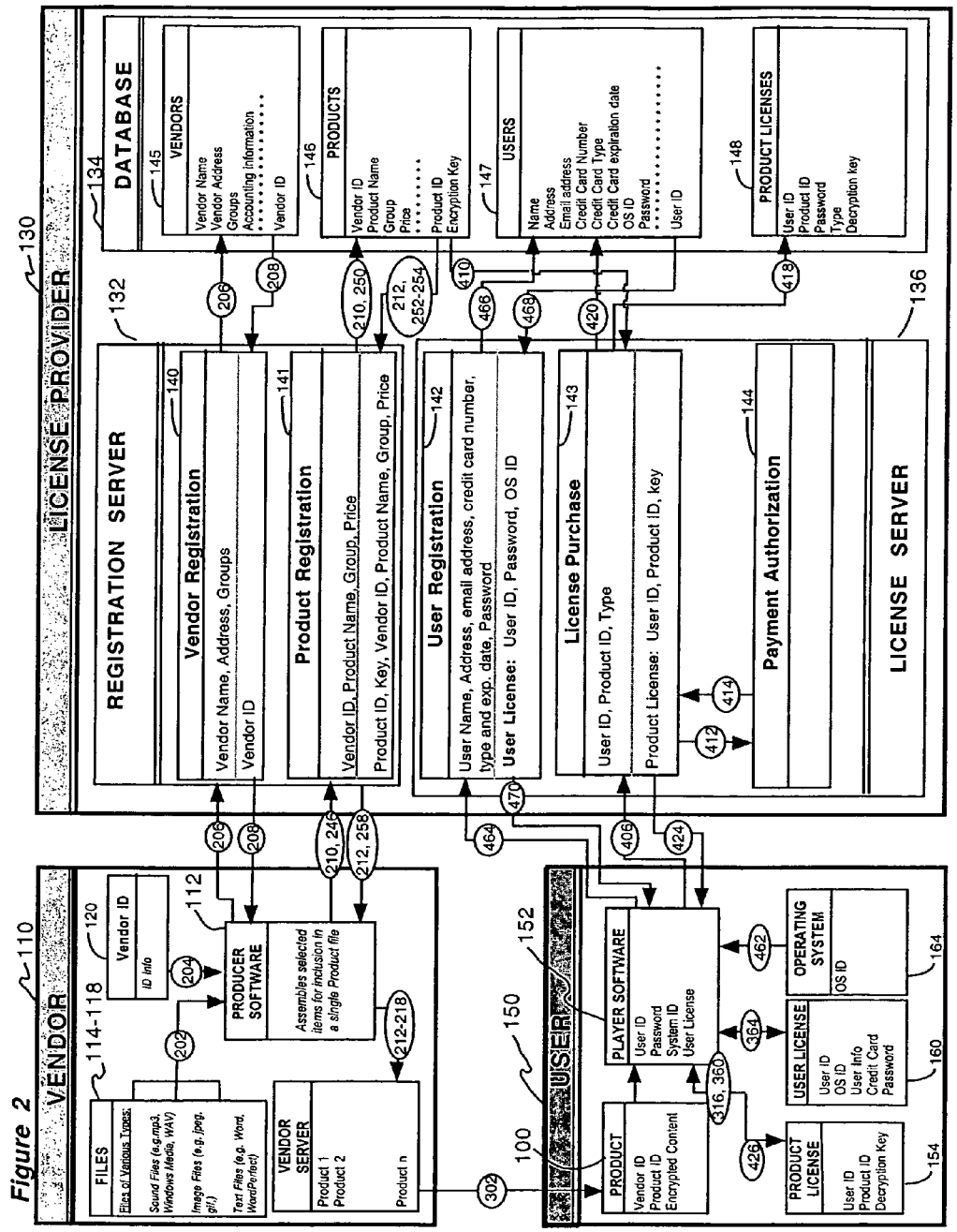
FIG. 2 is a schematic illustration of the present invention showing the flow of data through the components.

More detail about the registration server 132, database 134, and the license server 136 can be seen in FIG. 2. Registration server 132 has two main components, vendor registration 140, and product registration 141. License server 136 has three main components; namely a user registration component 142, a license purchase component 143, and a payment authorization component 144. These components are simply one way of dividing the functions of the two servers 132, 136. Many ways are possible and within the scope of the present invention.

Similarly, in the preferred embodiment, database 134 contains entries (tables or sub-databases) for at least the following types of data: vendors 145, products 146, users 147, and product licenses 148. More detail concerning the tables in the database 134 of the preferred embodiment can be seen in FIG. 9, as described below.

Returning to FIG. 1, the product file 100 that is created by the producer software 112 contains the music 114, data 116, and images 118 that were entered into producer 112. This content 104 is stored in an encrypted format in the file 100. File 100 also contains a vendor ID 120 that indicates the vendor 110 who created the file 100, as well as a product ID 102 that uniquely identifies the product file 100. The vendor 110 can make the product file 100 available to users 150 in a variety of manners well known in the prior art, such as through download from a web site or via FTP. The vendor 110, the license provider 130, or any other party can host these sites, since there is no need for the party hosting the product file 100 to be a license provider 130. The product file 100 is not altered after creation by the vendor 110. Consequently, the product file 100 can be freely transferred from user 150 to user 150, with each user being able to separately license the file 100.

The user 150 can access the content 104 on the product file 100 using player software 152. In the preferred embodiment, where the content 104 of file 100 contains music 114 and related materials 116, 118, the player software 152 is capable of playing the music 114 to end users, while also allowing users access to the lyrics, images, and other content 104 in file 100. A sophisticated player 152 would also be able to take a UPC code from the product file 100 and electronically search various audio/video Internet-based retailers for the availability and price of physical copies (such as a CD) of the music collection in file 100.

To have total access to the encrypted content 104 in file 100, the user 150 will have to obtain a product license 154 that contains the decryption key 158 specific for that product file 100. The product license is obtained by interaction between the player software 152 and the license server 136. Alternatively, product licensing could be handled at the user level 150 by a different program operating on the same computer as, and in conjunction with, the player software 152. For ease in description, the player software 152 will be described as having both playback capabilities and license handling capabilities, although it would be well within the scope of the present invention to split these actions into two separate interacting programs.

Because a product license 154 is also specific for a particular user 150, the user 150 must obtain their own user license 160 from license server 136 before any products 100 can be licensed. The product license 154 and the user license 160 are both stored at the computer of the user 150 as well as in the database 134 of the license provider 130. In order to protect the product license 154 and user license 160 from unauthorized access and alteration, both licenses 154, 160 are protected with triple-DES ("3DES") encryption. The product license 154 is limited to a specific product file 100 because the product license contains the product ID 102. The product license 154 is also limited to a particular user by containing a user ID 156, which is also found in the user license 160. The user license 160 is limited to a particular user 150 in part by tying the user license 160 to identifying information 162 stored in the operating system 164 of the user's computer. Because in the preferred embodiment the user license 160 will contain credit card numbers and other confidential information of the user 150, the user license 160 will be protected by password 163.

As part of the license process, the user 150 will authorize that a payment be made in return for the license. Thus, before the user license 160 is returned to the user, the license server 136 will contact the payment service 170 to collect payment from the user 150. Typically, this will be done through either a credit card transaction or through some type of electronic cash or some similar Internet payment system. The payment service 170 is generally capable of directly crediting an account belonging to the vendor 110 that created the product file 100.

2. File Creation Process 200

FIG. 2 shows the flow of data through the various components of the system. This FIG. 2 is best viewed in light of the flow charts found in FIGS. 3 through 8. Where possible, the steps found in the flow charts are shown with arrows on FIG. 2, with the step reference numeral on or near the arrow.

Figure 3:
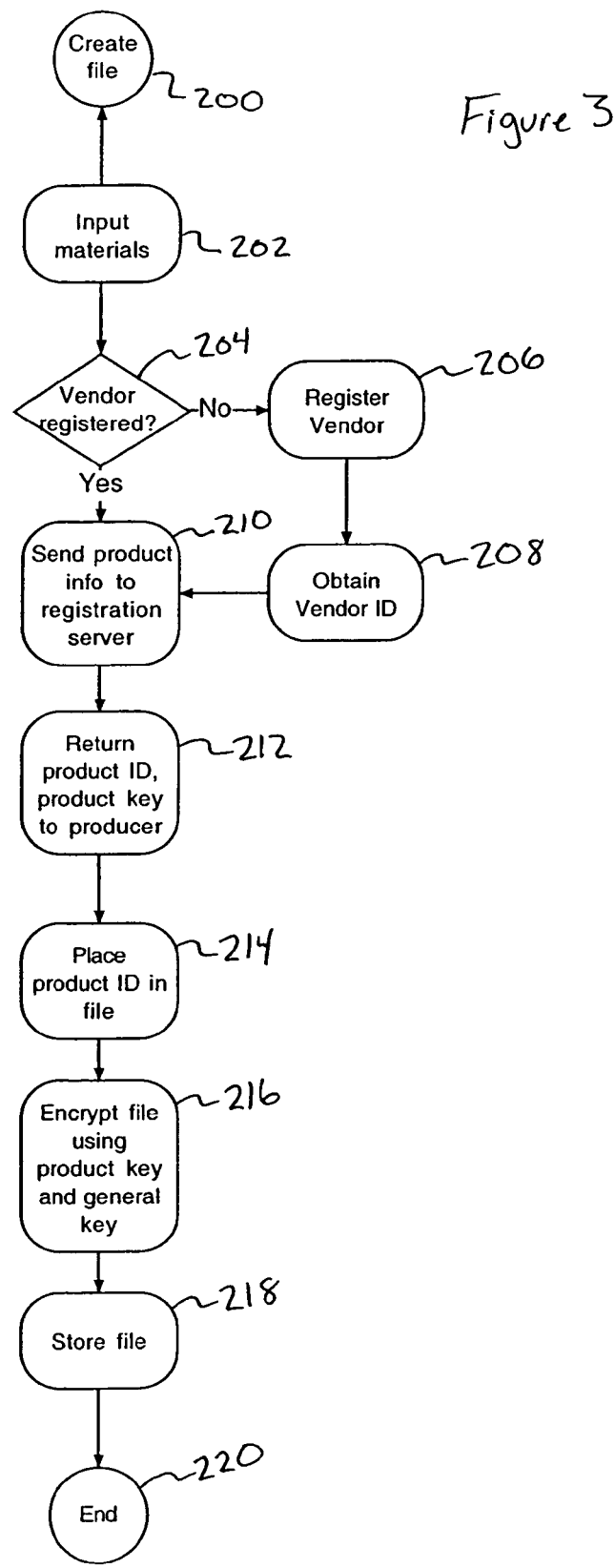
FIG. 3 is a flow chart showing the process for creating a file.

The procedure for creating file 100 is shown as process 200 in FIG. 3. First, the vendor 110 accumulates in the producer program 112 the materials 114–118 that will be combined into file 100, as seen in step 202. The producer program 112 will then contact the registration server 132, and the registration server 132 determines whether the vendor 110 needs to register as a new vendor (step 204). Alternatively, producer program 112 could merely search for vendor ID 120 on its local computer to determine if it needs to register. If the vendor 110 has not previously registered, vendor 110 provides information about itself, which is used by the registration server 132 to create a vendor entry in database 134 (step 206). In this process, registration server 132 assigns a vendor ID 120 to the vendor 110 (step 208). The vendor ID 120 is then stored both in the database 134 in the vendor record 145 and in the computer used by vendor 110. The vendor ID 120 is preferably stored in the operating system registry of the computer used by the vendor 110. It is also preferred to allow the vendor 110 to freely move the vendor ID 120 to multiple computers, thereby allowing the vendor 110 to make music files 100 from multiple locations or through multiple employees. The vendor ID 120 is then used in all later communications between the registration server 132 and the vendor 110.

Alternatively, rather than requiring information from the vendor 110 at the time the vendor entry is made into the database 134, an entry can be made with no information merely to create a vendor ID 120. The vendor 110 could then be allowed to enter and edit information about itself and its product files 100 at a later date, such as by logging in with the vendor ID 120 at a web site.

Once the vendor 110 is registered as a vendor, the producer software 112 contacts the registration server 132 and sends to server 132 its vendor ID 120 and information about the file 100 being created (step 210). The information sent will include the product name, the license fee amount, and the category or group in which the vendor 110 wishes to locate the file product 100. These categories can be universal categories, or, preferably, be categories created and separately maintained for each vendor 110.

The registration server 132 then creates a product entry 146 in the database 134 and returns the information need by the producer software 112 to create file 100 (step 212). Specifically, the registration server 132 returns a product ID 102 and a DES encryption key. The details surrounding the submission of product information to the registration server and the return of the product ID 102 and encryption key (steps 210 and 212) are described in more detail below in connection with FIG. 4.

The producer program 112 inserts the received product ID 102 in the file 100 being created (step 214). To ensure against unauthorized access to the music in file 100, at least the music information is encrypted with the product specific DES encryption key received from the registration server 132 (step 216). In the preferred embodiment, encryption is also used to protect header sections of file 100. The encryption of header sections is preferably done with a general DES encryption key that is the same with all copies of producer program 112, rather than the product specific DES key returned by the registration server 132. The header section contains basic information about the file, including title and musician, and also the checksums that guarantee the integrity of the content 104. The preferred embodiment also uses headers to define basic information about each track of music contained in file 100. These track headers are also compressed with the DES key known to all producer applications 112 as well as all player software 152.

After the encryption is finished in step 216, the producer software 112 saves the complete music file 100 (step 218). The process of creating file 100 is then complete, as shown as step 220.

3. File Registration Process 240

Figure 4:
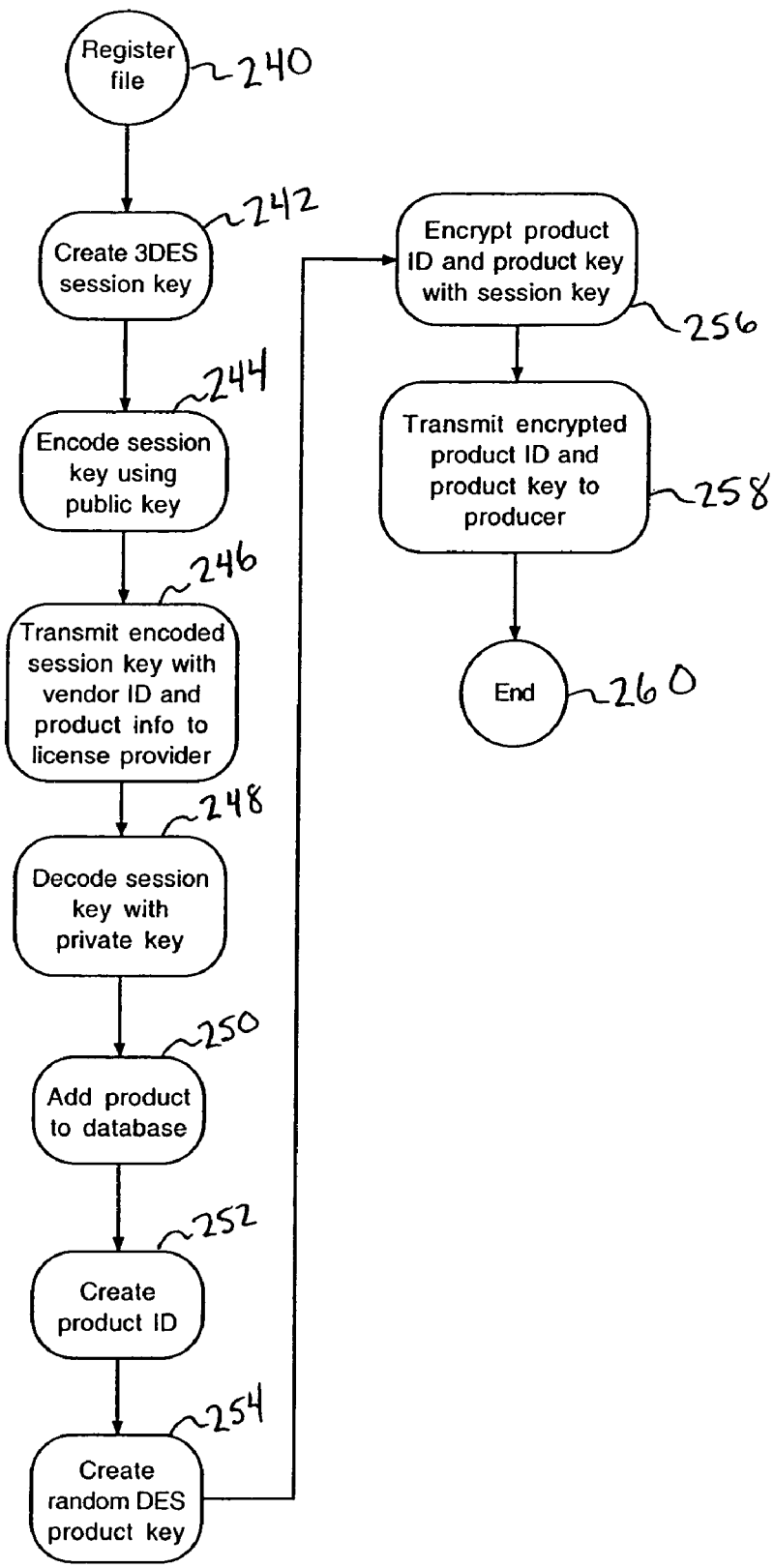
FIG. 4 is a flow chart showing the process for registering a file.

The details of the file registration process 240 are set forth in FIG. 4. The first step 242 is for the producer software 112 to create a unique 3DES encryption key for the upcoming communication session with the license provider 130. The 3DES encryption algorithm is a symmetrical encryption system. Thus, this newly created 3DES session key must be communicated to the license provider 130 before 3DES encryption can be used for communication. In order to transmit this session key to the license provider 130 in a secure fashion, the session key is itself encrypted with a public encryption key whose matching private key is known only to the license provider 130 (step 244).

The encrypted session key is then transmitted along with the product information and the vendor ID 120 to license provider 130, as shown in step 246. The license provider 130 then uses its private key to decrypt the 3DES session key created by producer software 112 (step 248).

The next step 250 is to create a new product entry 146 into database 134 using the information transmitted along with the session key in step 246. When a new product is entered into database 134, the license provider 130 creates a product ID 102 and stores this ID 102 with the other product information in database 134 (step 252). In addition to the product ID 102, the license provider 130 also generates a random DES encryption key that will serve as the product encryption key (step 254). This product encryption key is also stored with the product information in database 134.

It is now necessary to transmit the newly generated product ID 102 and product encryption key back to the producer software 112. In order to transmit this information securely, it is encrypted using the session key that was previously generated by producer software 112 (step 256). Once this is accomplished, the encrypted product ID 102 and the product encryption key can be transmitted back to vendor 110 (step 258), and the register file process is completed (step 260).

4. Playing a Product File 300

Figure 5:
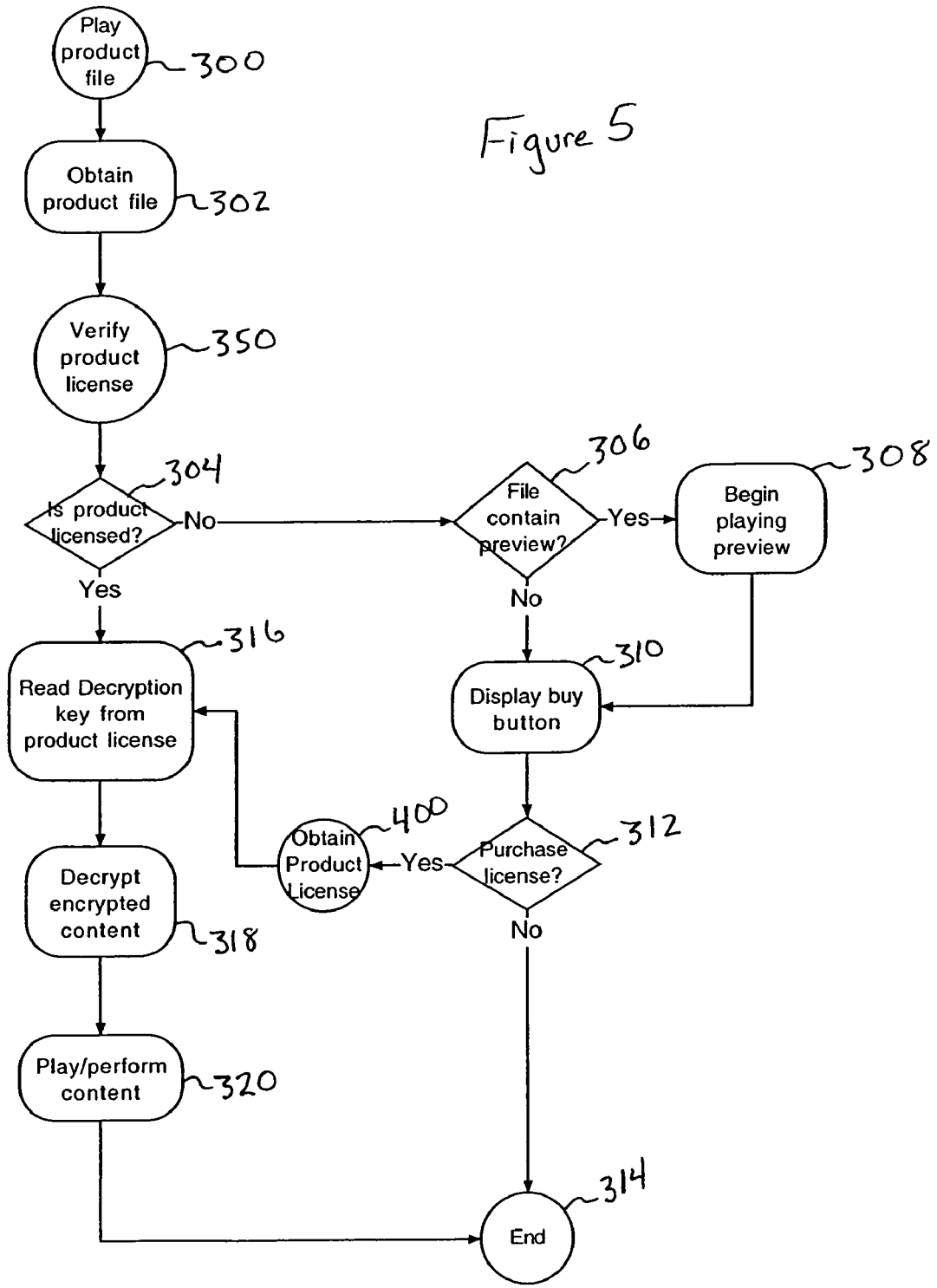
FIG. 5 is a flow chart showing the process for playing a product file.

FIG. 5 shows the process 300 for playing a product file 100. The process 300 starts by the user 150 obtaining the product file 100 created by vendor 110 (step 302). Typically, this is done by downloading the file 100 from a web site sponsored by vendor 110, license provider 130, or any other source. In addition, since the file 100 is not changed during the license process, user 150 can obtain the file 100 from any other user 150, regardless of whether the other user 150 had licensed the product 100 or not.

The next step in playing the file 100 is for the player software 152 to determine whether or not user 150 has a valid product license 154 for the file 100. This is done in process 350, which is described below in more detail in connection with FIG. 6. Player 152 takes different steps depending on whether a valid product license exists, which is analyzed in step 304. If there is no valid product license 154, the product file 100 is examined to determine whether any preview content exists in the file (step 306). If there is preview content, that content is then played by the player 152 in step 308.

While the preview is playing, the player 152 should then present user 150 with the option to purchase a product license 154 for the file 100. This is done in step 310, which is also performed even if the file 100 did not contain preview information. If the user 150 does not wish to license the file 100 (as determined at step 312), then the process 300 for playing a file 100 is completed (step 314). If the user 150 does choose to purchase a product license 154 for the product 100, then process 400 for obtaining a file license is performed. Process 400 is described below in more detail in connection with FIG. 7.

Whether a valid product license 154 is determined to exist at step 304, or whether a new product license 154 is purchased through process 400, it is possible to then play the complete contents 104 of the product file 100. This is accomplished by reading the decryption key from the product license 154 in step 316, and then decrypting content 104 with this key in step 318. The decrypted content 104 is then performed by player 152 in step 320, and the process 300 completes at step 314.

5. Verifying an Existing Product License 350

Figure 6:
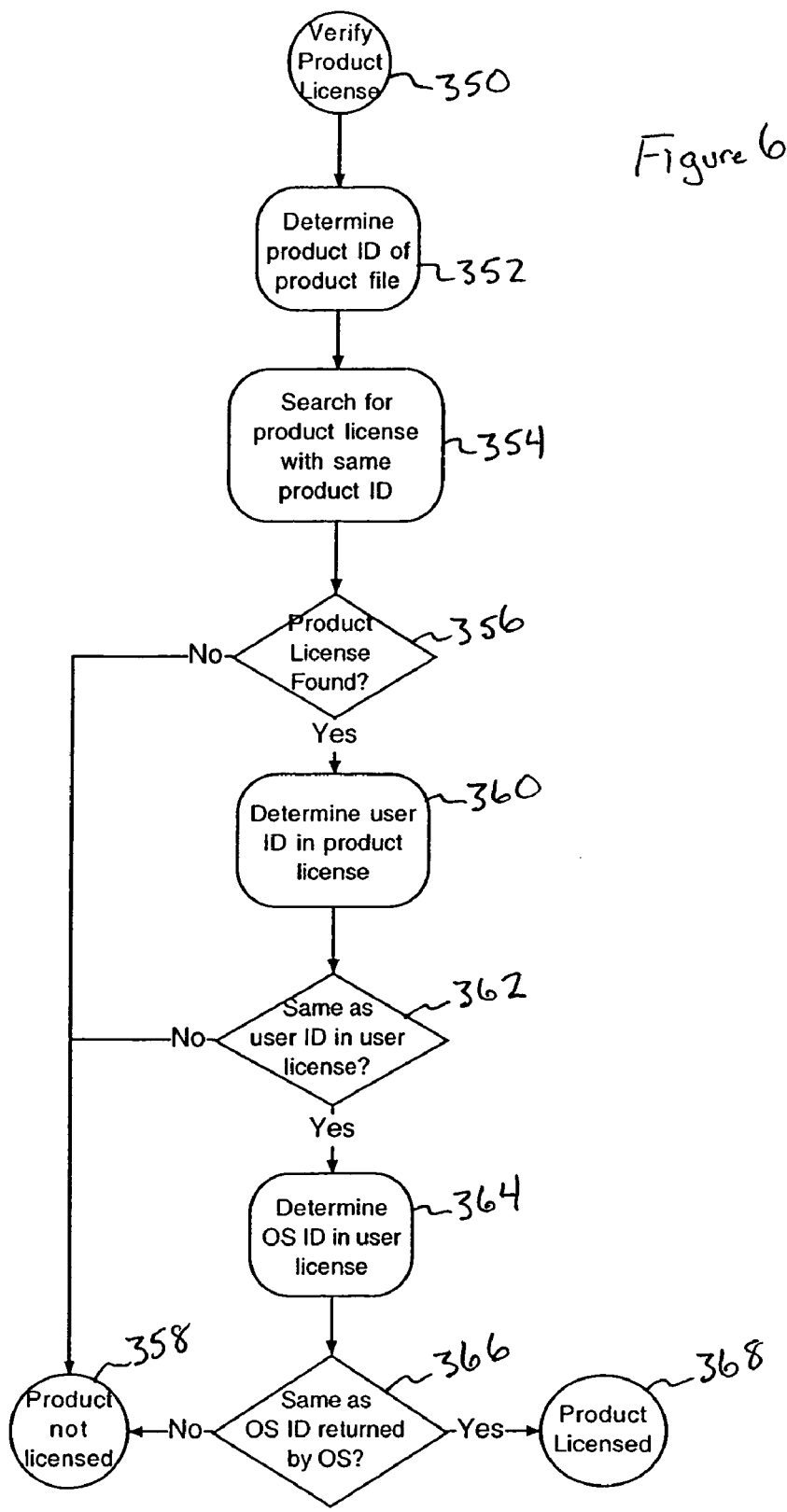
FIG. 6 is a flow chart showing the process for verifying a product license.

The process 350 of verifying an existing product license is shown in the flowchart of FIG. 6. The first step 352 is to examine the product file 100 to determine the product ID 102. The player 152 then examines all of the product licenses 154 available to the user 150 in search for a product license 154 that contains the same product ID 102 (step 354). The product licenses 154 can be stored on the computer of user 150 in a variety of ways. For instance, each product license 154 could exist in its own independent file. Alternatively, the product license 154 could form part of a registry or other service database maintained by the operating system 164 of the computer. The product licenses 154 could even consist of an entry in a database, plain file, or structured file that is maintained by player software 152 in a customized format.

After searching, it must be determined if any applicable product licenses 154 were found (step 356). If not, the process 350 has determined that the product 100 is not licensed, and the process 350 ends with that result in step 358. If a product license 154 was found containing the correct product ID 102, then that product license 154 is examined to determine the user ID 156 for that license 154 (step 360). The user license 160 for the current user 150 is then examined to see if its user ID 156 matches the user ID 156 of the product license 154 (step 362). If not, the product 100 is not properly licensed and the process 350 ends at step 358.

If the user IDs 156 match, the player software 152 then examines the operating system ID 162 that was stored with the user license 160 (step 364). This OS ID 162 is then compared to the identification that is returned live from the operating system 164. The OS ID 162 is basically some identification that is unique to the currently operating computer or the current user of the operating computer. For example, in the Windows 95/98 operating system from Microsoft Corporation (Redmond, Wash.), the OS ID 162 can be the registered user's name for the operating system. While different operating systems have different types of system values that are retrieved in different ways, the player software 152 should be able to extract some type of identifying information from the operating system 164 in which it operates. If step 366 determines that the two retrieved OS IDs 162 do not match, then the process 350 ends with no valid license at step 358. If the OS IDs 162 do match, process 350 ends by returning a value indicating that a valid license for the file 100 has been found (step 368).

This last step of examining the OS IDs 162 is useful in verifying that the user license 160 was created or otherwise appropriate for this computing environment. This helps to prevent the "sharing" of user licenses 160 between differing users 150. However, since the user license 160 will contain personal, private financial information about a user 150, namely the user's credit card information, there is already a strong disincentive against sharing a user license 160. Thus, it would be well within the scope of the present invention to skip steps 364 and 366 in process 350, and rely on the existence of private information in the user license 160 to prevent the sharing of user licenses 160.

6. Obtaining a File License 400

Figure 7:
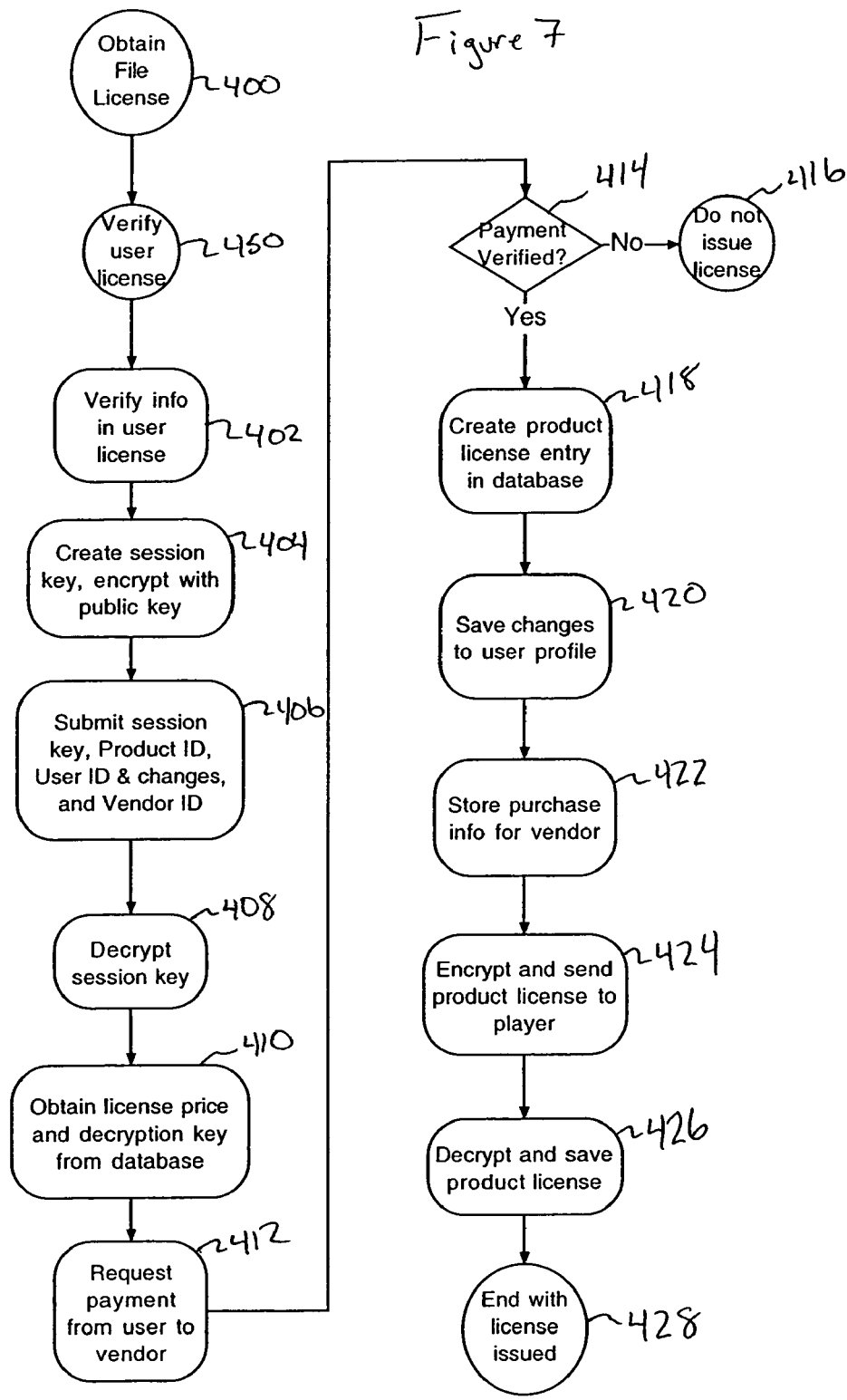
FIG. 7 is a flow chart showing the process for obtaining a product license.

The process 400 for obtaining a product file license 154 is shown in the flowchart of FIG. 7. Before anything else in process 400, the player software 152 must verify that the current user 150 is known to the license server 136. This is done by checking for and verifying the current user license 160, a process 450 which is described in detail below in connection with FIG. 8.

Once a valid user license 160 has been identified by process 450, the information in the user license 160 will be presented to the user 150 for verification (step 402). Of course, this step 402 could optionally be skipped if the user 150 had just created their user license 160 in process 450. Generally, the information will be presented visually to the user 150 in this step 402, and the user 150 will be given the opportunity to change any of the relevant information. Among the information shown will be the credit card number that was previously used by the user 150. Because most users 150 would be very reluctant to let others see their credit card number, the showing of the number to the user 150 at this stage should serve as a deterrent to users 150 sharing their user licenses 160 and their passwords with other users. In addition to a credit card number, it is well within the scope of the present invention to use other private information for payment purposes and for providing a disincentive toward sharing a user license. Examples of such information include a bank account number, gift certificate number, a debit card number, and a stored value card number. Non-financial related information could also be used solely to help prevent the sharing a user license, including a social security number, or even a home address and telephone number.

Once the user 150 has validated the information from their user license 160, the player software 152 randomly generates a new 3DES session key. This session key will be used to encrypt the information contained in the product license 154 that will be retrieved from the license server 136. Because the 3DES encryption scheme is a symmetrical encryption scheme, and because the player software 152 randomly generates the 3DES key, it is necessary to securely transmit this new key to the license server 136. This is accomplished by encrypting this new key using a public key for which only the license server 136 knows the matching private key. This is all accomplished in step 404.

The player software 152 next submits to the license server 136 a request for a new product license 154 (step 406). This submission includes the appropriate product ID 102, the user ID 156 of the user 150, the vendor ID 120 found in file 100, the encrypted 3DES session key, and any changes to the user profile made by user 150.

The license server 136 will then decrypt the session key with its private key (step 408). The next step 410 is to access the product information stored in database 134 to obtain the license price and decryption key for the product file 100. Although the license price is probably also stored with product file 100, it may be wise to verify this license price against the database even if the license price was submitted along with other information in step 406. The vendor ID 120 can also be verified against the vendor ID 120 associated with the product entry in database 134. Alternatively, the vendor ID 120 could be excluded from the submission of step 406, with the vendor ID 120 simply being determined through the database 134. Of course, the decryption key (which is the same as the encryption key created in step 254) is stored only in database 134 and is not found in product file 100.

In step 412, the license server 136 then requests that the payment service 170 make a payment from the user 150 in favor of the vendor 110 identified by the vendor ID 120. In the preferred embodiment, all communications by the license server 136 to the payment service 170 are handled by the payment authorization component 144, as shown in FIG. 2. Typically, the payment authorization component 144 uses external credit card gateways as the payment service 170. The license server 136 can submit the payment request as if the request is coming from any of the vendors 110 that might be identified in the vendor ID 120. In this way, payment will be made directly from the payment service 170 to the vendor 110. Typically, the license provider 130 will collect some payment for its service. When the payment from the payment service 170 goes directly to the vendor 110, the license provider 170 must track these license purchases in its database and the regularly bill the vendor 110. Alternatively, the payment request can be made in favor of the license provider 130 itself. In this case, the license provider 130 will track license purchases in its database and make regular payments to vendors 110.

The payment authorization component 144 can do some validity preprocessing of the payment information before submission of the request to the payment service 170. Examples of preprocessing that are done in the preferred embodiment of the present invention include verifying the structure of the credit card number, such as by examining the starting digit and the total number of digits.

The payment service 170 will then indicate to the license server 136 whether payment was actually made. If step 414 indicates that no payment was made (for instance, because the credit card number was invalid), the process for obtaining a file license 400 terminates at step 416 with no license issued.

If the payment if verified, then the license server 136 creates a product license entry 148 into database 134 (step 418). At a minimum, the license entry will contain the product ID 102, the user ID 156 and the decryption key 158. It is possible to develop a license that is has limitations in it, such as date limitations or site limitations. If such limitations are desired, those limitations would be inserted into the database 134 as part of the license entry 148. The limitations would also appear inside the product license 154. It would be up to the player software 152 to interpret and enforce license limitations when it reads a product license 154 containing such limitations.

The license server 136 should also save to database 134 any changes to the user data that were submitted in step 406. This is done in step 420. In addition, it may be useful to maintain data on all licenses furnished by the license server 136 for purposes of both billing the vendor 110 and to allow vendor to see product license information and trends. Information that would allow this kind of tracking, such as customers' names, dates of purchase and total purchase amounts, is stored in a transactions database entry made to database 134 in step 422.

The license server 136 must then return the product license 154 to the player software 152 (step 424). In order to ensure secure transit of the product license 154, the product license 154 is first encrypted using the 3DES session key generated in step 404. When the product license 154 is received by player software 152, it is decrypted with the session key and then saved for later use in step 426. The product license 154 is always stored in an encrypted format to keep it protected. The process of obtaining a file license 400 is then completed with the license issued at step 428.

7. Verifying a User License 450

Figure 8:
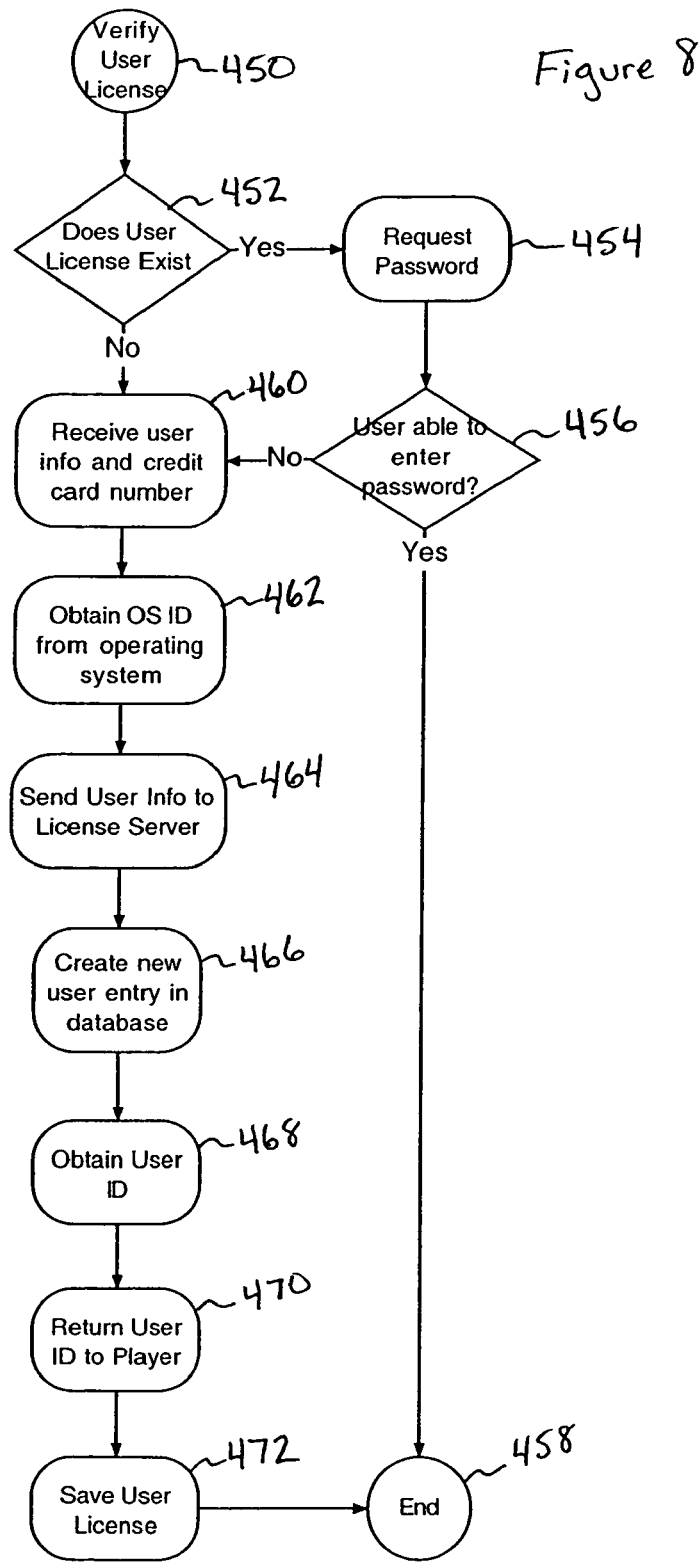
FIG. 8 is a flow chart showing the process for verifying a user license.

The process for verifying a user license is shown as process 450 in FIG. 8. The first step 452 is to determine whether a user license 160 exists. If so, the user 150 is asked to enter the password 163 for the user license 160 (step 454). If the user is successfully able to enter the password 163 that was stored with the user license 160, which is checked in step 456, then the user license 160 has been verified and process 450 terminates at step 458.

If a user license 160 does not exist, or if the user 150 is not able to successfully enter a password, then it is necessary to create a new user license 160. This is done by having the user 150 enter personal information such as name, address, e-mail address, as well as a password 163 and a valid credit card number (step 460). The player software 152 will then obtain the OS ID 162 from the operating system 164 (step 462). All of this information is then transmitted to the license server 136 in step 464.

Upon receipt of a request for a new user license 160, the license server 136 will create a new entry in the users portion 147 of database 134 (step 466). When this is done, the license server 136 or the database 134 generates a new user ID 156 and saves it in the database with the user information (step 468). The newly created user ID 156 is then transmitted back to the player software 152 along with the other components of the user license 160, including the OS ID 162 and the password 163 (step 470). Alternatively, only the user ID 468 could be returned and then combined with the information obtained by the player software 152 in steps 460 and 462 to create the user license 160. The last step 472 is to save the user license 160 so that it can be retrieved at a later date. The user license 160 will be stored in an encrypted format, preferably using the 3DES technology. The process 450 then terminates at step 458.

8. License Restoration Process

Users 150 are authorized to transfer user licenses between machines a limited number of times. If the license is transferred without any interaction with the player software 152 or the license server 136, the transfer will be unsuccessful because a user license 160 is tied to a specific machine through the OS ID 162. If the license were merely moved without changing the embedded OS ID 162, there would not be a match in step 366, and the user license 160 would be ineffectual.

To accomplish the transfer of user licenses 160, the player software 152 has the ability to save the license information to a safe location such as a floppy disk. If the hard disk containing the user license 160 then crashes, the user 150 can restore the user license 160 through the player software 152. To do so, the player software 152 requires the user 150 to enter the correct password 162. Then the player software 152 contacts the license server with request to recover a user license 152. This request would contain basically the same information sent to the license server 136 in step 464, including the new OS ID 162, as well as the User ID 156 that is being recovered. Assuming that user has not restored their user license 160 more than the pre-determined limit, the license server 136 will return a new user license 160 that will work with the new OS ID 162.

The license server 136 keeps track of the number of times license restoration is attempted by a user 150. A limit is placed on how many times one can restore licenses from the license server 136. If credit card numbers are not always required to obtain a user license 160, then a lower limit for restorations can be placed on users 150 whose user license 160 does not contain credit cart information. Using this technique, it is possible to move a user license 160 to a different computer, albeit only limited number of times.

If a hard drive is lost, not only is the user license 160 lost, but so also are all of the product license 154 that were on the drive. Consequently, player software 152 also allows a user 150 with a valid user license to query database 134 and download all known product licenses 154 for the user's user ID 160 that are not currently on the hard drive. In this way, a user can secure his or her licenses merely by backing up the user license to a floppy disk through the utility provided by player software 152. It is also possible in this manner to have a duplicate set of user license 160 and product licenses 154 on multiple computers.

9. Database 134

Figure 9:
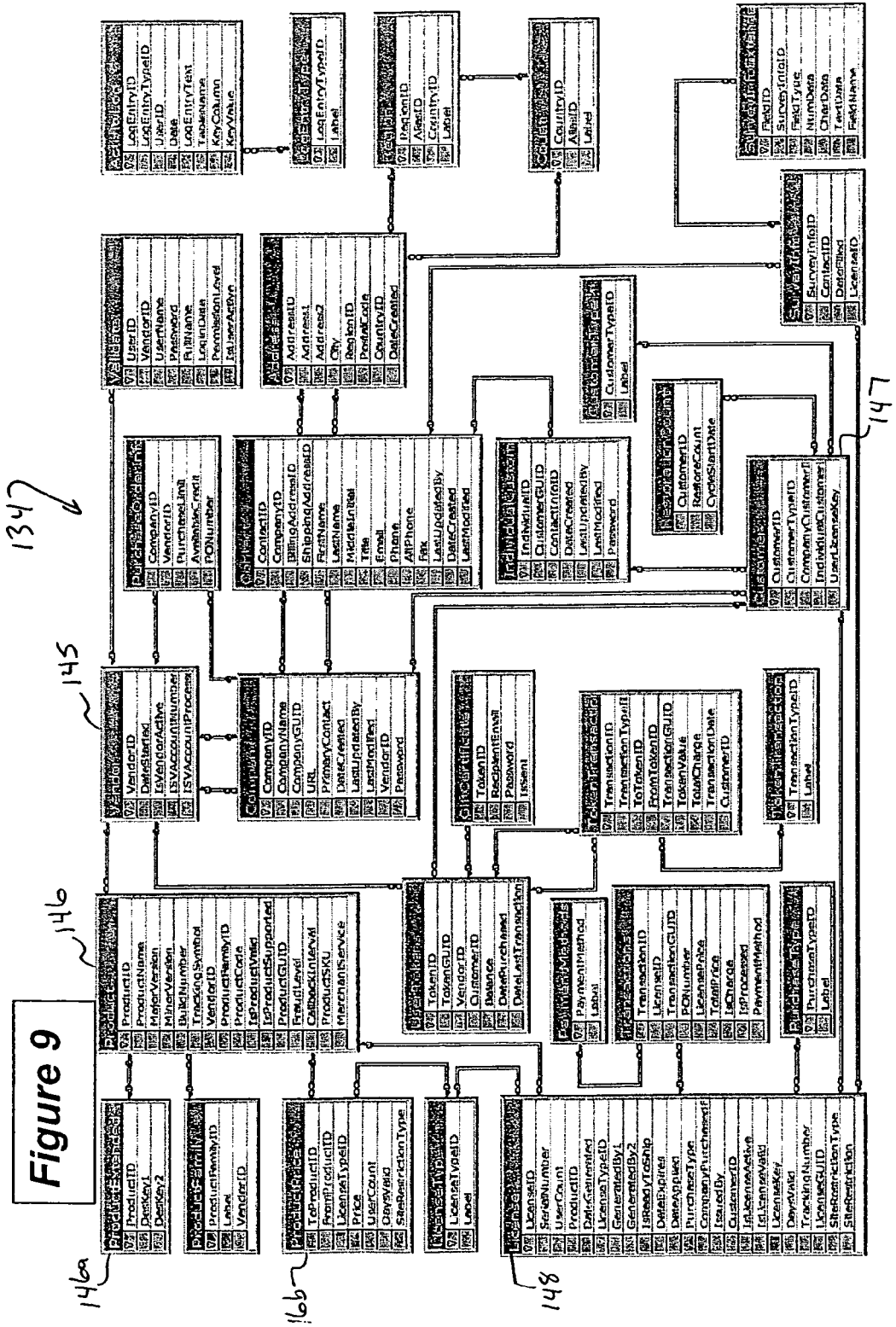
FIG. 9 is a schematic illustration of the tables comprising the database used in the preferred embodiment of the present invention.

As shown in FIG. 2, database 134 contains numerous sub-databases or tables, including vendors 145, products 146, users 147, and product licenses 148. A more complete definition of the database 134 is shown in FIG. 9. As seen in that figure, the database 134 is a relational database comprising many related tables, such as vendor table 145, product table 146, user table (labeled "Customer") 147, and product license table (labeled "License") 148. Because of the relational nature of the preferred embodiment of database 134, some of the information shown in a single table in FIG. 2 is actually contained in multiple tables in FIG. 9. For instance, the decryption keys are actually stored in a "Product Extended" table 146a, while the product price is actually stored in a related "Product Price" table 146b.

Although an illustrative version of the system and method is shown, it should be clear that many modifications to the system and method may be made without departing from the scope of the invention. For instance, the flow charts described above requested that a user 150 enter the password stored in the user license 160 only when the user 150 was purchasing a new product license 154. No password was required when the user 150 was merely playing a file 100 under an existing product license 154. It would be well within the scope of the present invention to require that the password be entered by the user 150 whenever the user license 160 is accessed to validate a product license 154. Alternatively, the password could be required just once each time the player software 152 is activated. Many possible combinations of features and elements are possible within the scope of the present invention, and therefore the scope thereof should be limited only by the following claims.

What is claimed is:

1. A method for electronically verifying that a user is licensed to access digital content within a content file comprising:
   a) obtaining a product ID from the content file stored on a user computer, the content file containing the digital content;
   b) electronically comparing the product ID from the content file with a second product ID found in a product license stored on the user computer;
   c) obtaining a first user ID from the product license; and
   d) electronically comparing the first user ID from the product license with a second user ID found in a user license stored on the user computer.

2. The method of claim 1, wherein the user license further contains personal information that is accessible to the user, such that the user would be reluctant to share the user license with other users.

3. The method of claim 2, wherein the personal information is a financial access number allowing access to financial resources of the user.

4. The method of claim 3, wherein the financial access number is a credit card number.

5. The method of claim 3, wherein the financial access number is of a type chosen from the following set: a bank account number, a gift certificate number, a debit card number, and a stored value card number.

6. The method of claim 1, further comprising:
e) obtaining identifying system information from the user license; and
f) comparing the identifying system information from the user license with identifying information obtained from a computer operating system being used by the user to access the digital content.

7. The method of claim 1, further comprising:
e) allowing access to a first portion of the digital content when the comparisons of step b) and d) both result in successful comparisons.

8. The method of claim 7, further comprising:
f) allowing access to a second portion of the digital content when either of the comparisons of step b) and d) are not successful.

9. The method of claim 8, wherein the first portion of the digital content is encrypted and the second portion of the digital content is not encrypted.

10. The method of claim 7, wherein the first portion of the digital content is encrypted using a product encryption key.

11. The method of claim 10, wherein the product encryption key is found in the product license.

12. A method for allowing a user on a computer to electronically access encrypted digital content found in a content file comprising:
a) accessing the content file stored on the computer to determine a product identifier found within the content file;
b) finding an appropriate product license that has the same product identifier as that found in the content file, the appropriate product license stored on the computer;
c) accessing the appropriate product license to determine a licensed user identifier associated with the product license;
d) finding an appropriate user license stored on the computer that has the same user identifier as that found in the appropriate product license;
e) accessing the appropriate product license to determine a decryption key associated with the product license; and
f) decrypting the encrypted digital content using the decryption key.

13. The method of claim 12, wherein non-encrypted data is found in the content file containing the encrypted digital content, and further wherein the non-encrypted data is accessible when the appropriate product license or the appropriate user license is not found.

14. The method of claim 13, wherein an option to purchase full access rights to the encrypted digital data is presented to the user when the appropriate product license or the appropriate user license is not found.

15. A system on a user computer for verifying that a user is licensed to access digital content, comprising:
a) a computer ID on the user computer uniquely identifying the computer;
b) a product in digital form stored on the user computer, the product including the digital content and a unique product ID;
c) a product license stored on the user computer, the product license including a user ID and the product ID; and
d) a user license stored on the user computer, the user license including the user ID and the computer ID; wherein the user ID, the product ID, and the computer ID are data identifiers;
e) software program stored on the user computer containing an algorithm that compares the product ID in the product with the product ID in the product license, and that compares the user ID in the product license with the user ID in the user license.

16. The system of claim 15, wherein the user license further includes personal information about the user.

17. The system of claim 15, wherein the product, the product license, and the user license are stored in encrypted form.

18. The system of claim 15, wherein the algorithm further compares the computer ID on the user computer with the computer ID in the user license.

19. A system for verifying that a user is licensed to access digital content comprising:
a) a product including the digital content and data comprising a unique product ID;
b) a product license stored as a data construct, the product license including a user ID and the product ID;
c) a user license stored as a data construct, the user license including the user ID; and
d) software programming containing an algorithm that compares the product ID in the product with the product ID in the product license, and that compares the user ID in the product license with the user ID in the user license.

20. The system of claim 19, wherein the user license further includes a computer system ID, and further wherein the software program algorithm compares the computer system ID from the user license with a system ID of a computer on which the software program is executing.

* * * * *